(12) United States Patent  
Lee

(10) Patent No.: US 9,209,714 B2  
(45) Date of Patent: Dec. 8, 2015

(54) VIBRATING ACTUATOR ASSEMBLY AND DIGITAL IMAGE PROCESSING APPARATUS INCLUDING THE SAME

(71) Applicant: SAMSUNG ELECTRONICS CO., LTD., Suwon-si, Gyeonggi-do (KR)

(72) Inventor: Seung-hwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 13/763,867

(22) Filed: Feb. 11, 2013

(65) Prior Publication Data

US 2013/0207516 A1  Aug. 15, 2013

(30) Foreign Application Priority Data

Feb. 15, 2012  (KR) .......................... 10-2012-0015536

(51) Int. Cl.
| | |
|---|---|
| *H02N 2/00* | (2006.01) |
| *H01L 41/09* | (2006.01) |
| *H02N 2/10* | (2006.01) |
| *H02N 2/12* | (2006.01) |
| *H02N 2/16* | (2006.01) |
| *G02B 7/08* | (2006.01) |

(52) U.S. Cl.
CPC ............... *H02N 2/103* (2013.01); *H02N 2/126* (2013.01); *H02N 2/163* (2013.01); *G02B 7/08* (2013.01)

(58) Field of Classification Search
USPC ........... 310/311, 323.01, 323.19, 323.21, 328  
See application file for complete search history.

(56) References Cited

U.S. PATENT DOCUMENTS

| | | | | |
|---|---|---|---|---|
| 4,937,488 | A  * | 6/1990 | Fujie et al. ............... | 310/323.03 |
| 5,229,678 | A  * | 7/1993 | Miyazawa ............... | 310/323.08 |
| 5,254,899 | A  * | 10/1993 | Suzuki et al. ............ | 310/323.03 |
| 6,198,201 | B1 * | 3/2001 | Okumura ................. | 310/323.03 |
| 6,274,965 | B1 * | 8/2001 | Daum et al. ............. | 310/323.11 |
| 6,404,104 | B1 * | 6/2002 | Maeno et al. ............ | 310/323.02 |
| 2003/0041435 | A1 * | 3/2003 | Kitajima et al. ............. | 29/527.3 |
| 2009/0105650 | A1 * | 4/2009 | Wiegel et al. ................. | 604/152 |
| 2010/0084946 | A1 * | 4/2010 | Park et al. ................ | 310/323.03 |

* cited by examiner

*Primary Examiner* — Thomas Dougherty  
(74) *Attorney, Agent, or Firm* — Drinker Biddle & Reath LLP

(57) ABSTRACT

A vibrating actuator assembly including: a rotor that is rotatable; a first stator disposed at one surface of the rotor and including a first vibrating plate that is elastically deformable and a first vibrating device that is disposed at the first vibrating plate and transforms the first vibrating plate by vibrating when an electrical signal is applied; and a second stator disposed at the other surface of the rotor and comprising a second vibrating plate that is elastically deformable and a second vibrating device that is disposed at the second vibrating plate and deforms the second vibrating plate by vibrating when an electrical signal is applied, in which electrical signals having different phases are respectively applied to the first and second vibrating devices.

17 Claims, 11 Drawing Sheets

VIBRATING ACTUATOR ASSEMBLY AND DIGITAL IMAGE PROCESSING APPARATUS INCLUDING THE SAME

CROSS-REFERENCE TO RELATED PATENT APPLICATION

This application claims the benefit of Korean Patent Application No. 10-2012-0015536, filed on Feb. 15, 2012, in the Korean Intellectual Property Office, the disclosure of which is incorporated herein in its entirety by reference.

BACKGROUND

Embodiments relate to vibrating actuator assemblies, and more particularly, to a vibrating actuator assembly capable of generating strong driving power by employing a compact structure and implementing precise position control, and a digital image processing apparatus including the same.

Optical systems including optical components, such as lenses, include lens driving mechanisms to move the lenses. The lens driving mechanisms perform a zooming function or an auto focusing function by changing relative distances between the lenses by moving the lenses.

Such conventional lens driving mechanisms may use a driving unit such as a stepping motor, and a reduction gear and a cam are used to change rotation of the stepping motor to a straight movement, and the size is increased and the structure becomes complex. Furthermore, an error may be generated due to a backlash during normal rotation or reverse rotation, power consumption may be increased, a high current may be required, and heat may be generated.

Recently, piezoelectric devices operating according to a piezoelectric effect are widely applied to move the lenses of the optical systems. Subminiature driving motors may be manufactured by using the piezoelectric devices.

However, in general optical systems using a piezoelectric device, since mechanical components, such as a gear or a cam, are used to convert a transformation movement of the piezoelectric device to driving power for moving lenses, a structure becomes complex and it is difficult to implement accurate position control due to an error between the mechanical components.

U.S. Pat. No. 5,892,317 discloses an actuator realizing a rotation movement of a moving element according to vibration of piezoelectric devices. According to the disclosed actuator, the moving element contacting an elastic body is rotated by transmitting vibration of the piezoelectric devices generated by applying an electric signal to the piezoelectric devices disposed on one surface of a rotor to the elastic body to deform the elastic body.

However, since the moving element is driven by using the elastic body and the piezoelectric devices are only disposed on one surface of the moving element, the piezoelectric devices have to self-generate a vibration movement of traveling waves. In this case, space efficiency is decreased since sections are classified by asymmetrically disposing the piezoelectric devices in a circumferential direction, and it is difficult to design and manufacture the actuator since intervals between the piezoelectric devices and lengths of the piezoelectric devices need to be precisely maintained.

Also, in order to effectively rotate the moving element, a protrusion on one surface of the elastic body that transmits force by frictionizing with the moving element needs to have predetermined rigidity, but the rigidity of the protrusion adversely affects the elastic body and the piezoelectric devices, and thus overall driving performance and a control performance are deteriorated. Also, in order to rotatably support the moving element, a separate bearing is provided, and thus an overall size of the actuator is increased. Also, performance of products may vary or operation noise may be generated according to variation in precision of the bearing.

In addition, since performance may vary according to assembled states of support structures when the actuator is assembled, a vibration movement by traveling waves generated in the piezoelectric devices may be deformed or resonance may be generated as vibration is transmitted to and reflected from other components.

SUMMARY

Embodiments provide a vibrating actuator assembly and a digital image processing apparatus including the same, having improved stability and reliability at a region where vibration is generated.

Embodiments also provide a vibrating actuator assembly that is driven by balanced vibration and having reduced friction loss.

Embodiments also provide a vibrating actuator assembly, wherein a phenomenon of a vibration movement by traveling waves that rotate a rotor being transformed or transmitted to another component is reduced.

According to an embodiment, there is provided a vibrating actuator assembly including: a rotor that is rotatable; a first stator disposed at one surface of the rotor and including a first vibrating plate that is elastically deformable and a first vibrating device that is disposed at the first vibrating plate and deforms the first vibrating plate by vibrating when an electric signal is applied; and a second stator disposed at the other surface of the rotor and including a second vibrating plate that is elastically deformable and a second vibrating device that is disposed at the second vibrating plate and deforms the second vibrating plate by vibrating when an electric signal is applied, wherein electrical signals having different phases are respectively applied to the first and second vibrating devices.

A plurality of the first vibrating devices may be disposed along a circumferential direction of the first vibrating plate.

A plurality of the second vibrating devices may be disposed along a circumferential direction of the second vibrating plate.

Adjacent first vibrating devices from among the plurality of first vibrating devices may have opposite polarities, and adjacent second vibrating devices from among the plurality of second vibrating devices may have opposite polarities.

The rotor may have a circular plate shape, and include protrusions protruding from at least one of two surfaces respectively facing the first and second stators.

A plurality of the protrusions may be spaced apart from each other along a circumferential direction.

A plurality of the protrusions may be disposed symmetrically with respect to a rotation center of the rotor.

The rotor may include a first through hole penetrating through the center of the rotor, and the vibrating actuator assembly may further include a rotation shaft inserted into the first through hole and rotating with the rotor.

The first vibrating plate may include a second through hole corresponding to the first through hole, the second vibrating plate may include a third through hole corresponding to the second through hole, and the rotation shaft may penetrate the first, second, and third through holes.

The vibrating actuator assembly may further include a rotation shaft disposed outside the rotor to contact the rotor and which rotates according to rotary power of the rotor.

A power transmitter transmitting the rotary power to the rotation shaft may be disposed between the rotation shaft and the rotor.

A screw surface may be formed on an outer circumferential surface of the rotation shaft, and the vibrating actuator assembly may further include a moving block disposed outside the rotation shaft and screwed to the screw surface to move along the rotation shaft as the rotation shaft rotates.

The vibrating actuator assembly may further include elastic members that surround at least a part of the peripheries of the first stator, the second stator, and the rotor and urge the first and second stators toward the rotor.

The vibrating actuator assembly may further include a casing surrounding and supporting the first stator, the second stator, and the rotor.

The vibrating actuator assembly may further include a plurality of elastic members each disposed between the first stator and the casing and between the second stator and the casing to urge the first and second stators toward the rotor.

The first vibrating device may include a piezoelectric layer which vibrates when electrical power is applied, and an electrode layer adhered to the piezoelectric layer to apply electrical power to the piezoelectric layer.

The second vibrating device may include a piezoelectric layer which vibrates when electrical power is applied, and an electrode layer adhered to the piezoelectric layer to apply electrical power to the piezoelectric layer.

The plurality of first vibrating devices may be spaced apart from each other at predetermined intervals along the circumferential direction based on the center of the first vibrating plate and are symmetrical around the first vibrating plate, and the plurality of second vibrating devices may be spaced apart from each other along the circumferential direction based on the center of the second vibrating plate so as to respectively correspond to the plurality of first vibrating devices and may be symmetrical around the second vibrating plate.

Locations of the first and second stators in a rotating direction may be offset in a predetermined angle such that locations of the plurality of second vibrating devices facing the plurality of the first vibrating devices are misaligned.

The first vibrating plate may include at least one adjusting protrusion that externally protrudes, and the second vibrating plate may include at least one adjusting protrusion that externally protrudes.

BRIEF DESCRIPTION OF THE DRAWINGS

The above and other features and advantages will become more apparent from the following detailed description of exemplary embodiments thereof with reference to the attached drawings in which.

DETAILED DESCRIPTION

Hereinafter, a structure and operations of a vibrating actuator assembly according to certain exemplary embodiments will be described in detail with reference to accompanying drawings. As used herein, the term "and/or" includes any and all combinations of one or more of the associated listed items.

Figure 1:
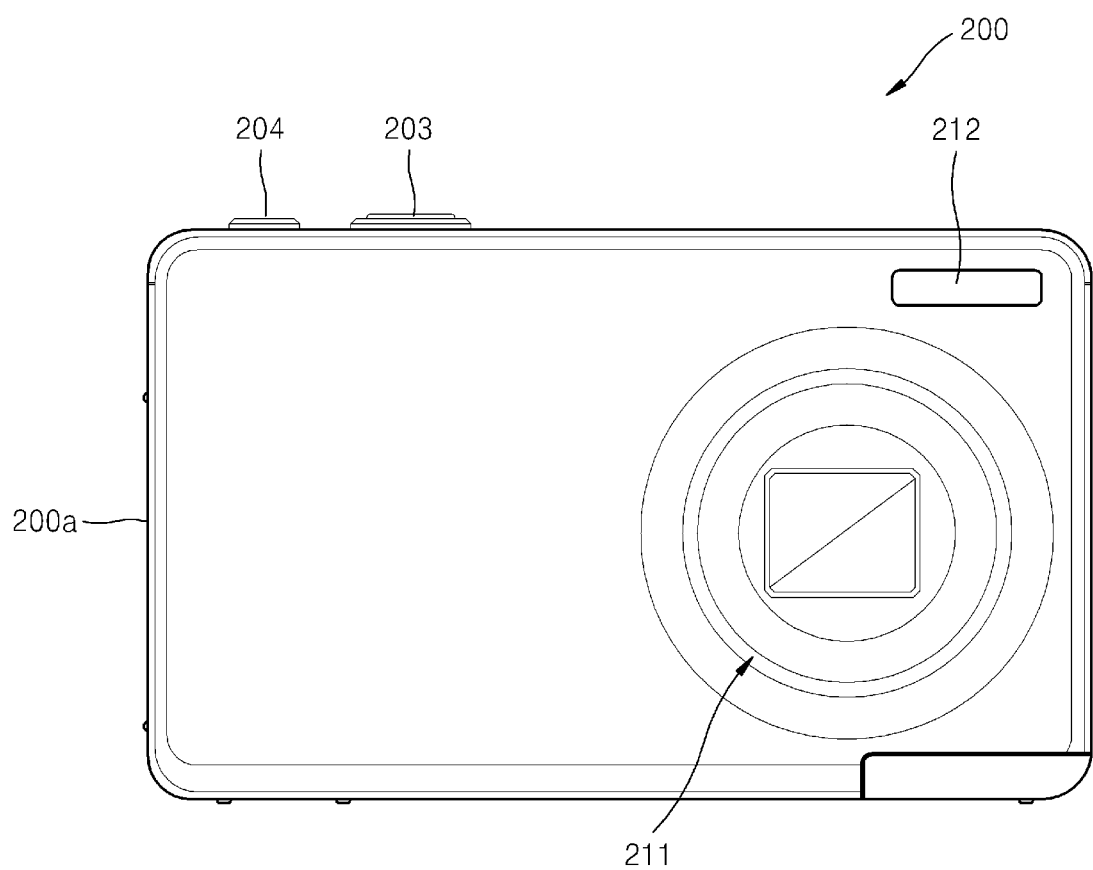
FIG. 1 is a front view of a digital image processing apparatus including a vibrating actuator assembly, according to an embodiment.

FIG. 1 is a front view of a digital image processing apparatus 200 including a vibrating actuator assembly, according to an embodiment.

The digital image processing apparatus 200 may include a lens unit 211, a flash 212, a power switch 203, and a shutter release button 204 on front and top surfaces of a body 200*a*.

The lens unit 211 may include at least one lens, and expose the at least one lens of the lens unit 211 outside the body 200*a* during photographing. The flash 212 may be disposed on one side of the lens unit 211 in front of the body 200*a* to emit light during photographing.

The power switch 203 may be used to turn on or turn off power such that the digital image processing apparatus 200 is operated. The shutter release button 204 may be pressed for a predetermined period of time so as to expose a film or an image pickup device, such as a charge coupled device (CCD), to light. The shutter release button 204 may suitably expose a subject to light by interlocking with an iris (not shown) so that an image is recorded in the image pickup device.

The lens unit 211 may include at least one barrel. When the digital image processing apparatus 200 is turned on according to an operation of the power switch 203 and enters a photographing mode, a barrel may protrude from the body 200*a*. The lens may be disposed inside the barrel. The lens may be supported by a lens holder and the lens may move in an optical axis direction as the lens holder moves in the optical axis direction.

Figure 2:
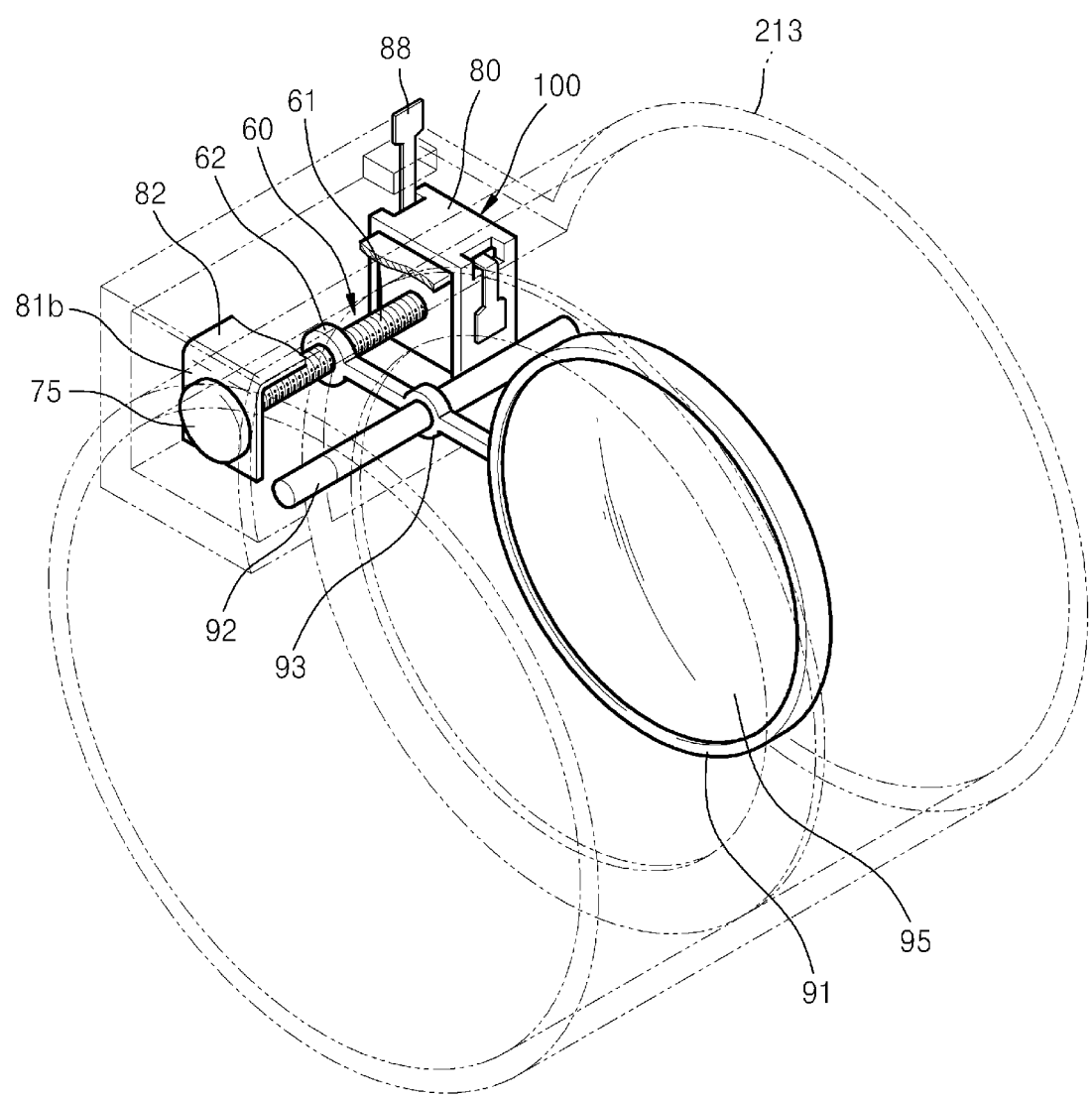
FIG. 2 is a perspective view schematically illustrating the vibrating actuator assembly of the digital image processing apparatus of FIG. 1.
Figure 3:
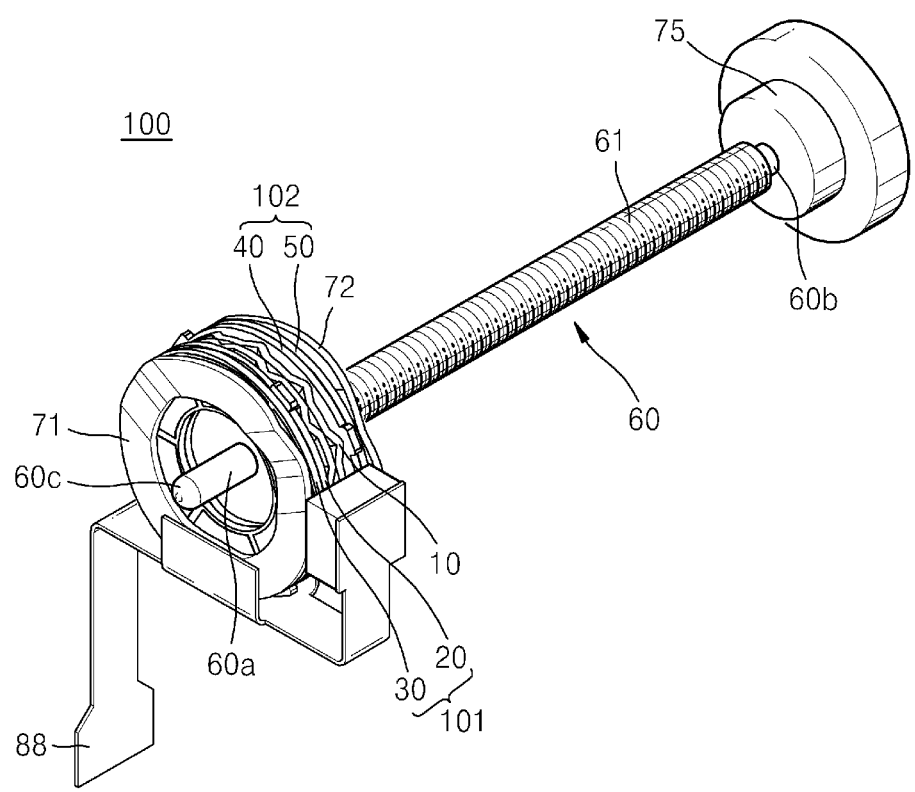
FIG. 3 is a perspective view of some components of the vibrating actuator assembly of FIG. 2.
Figure 4:
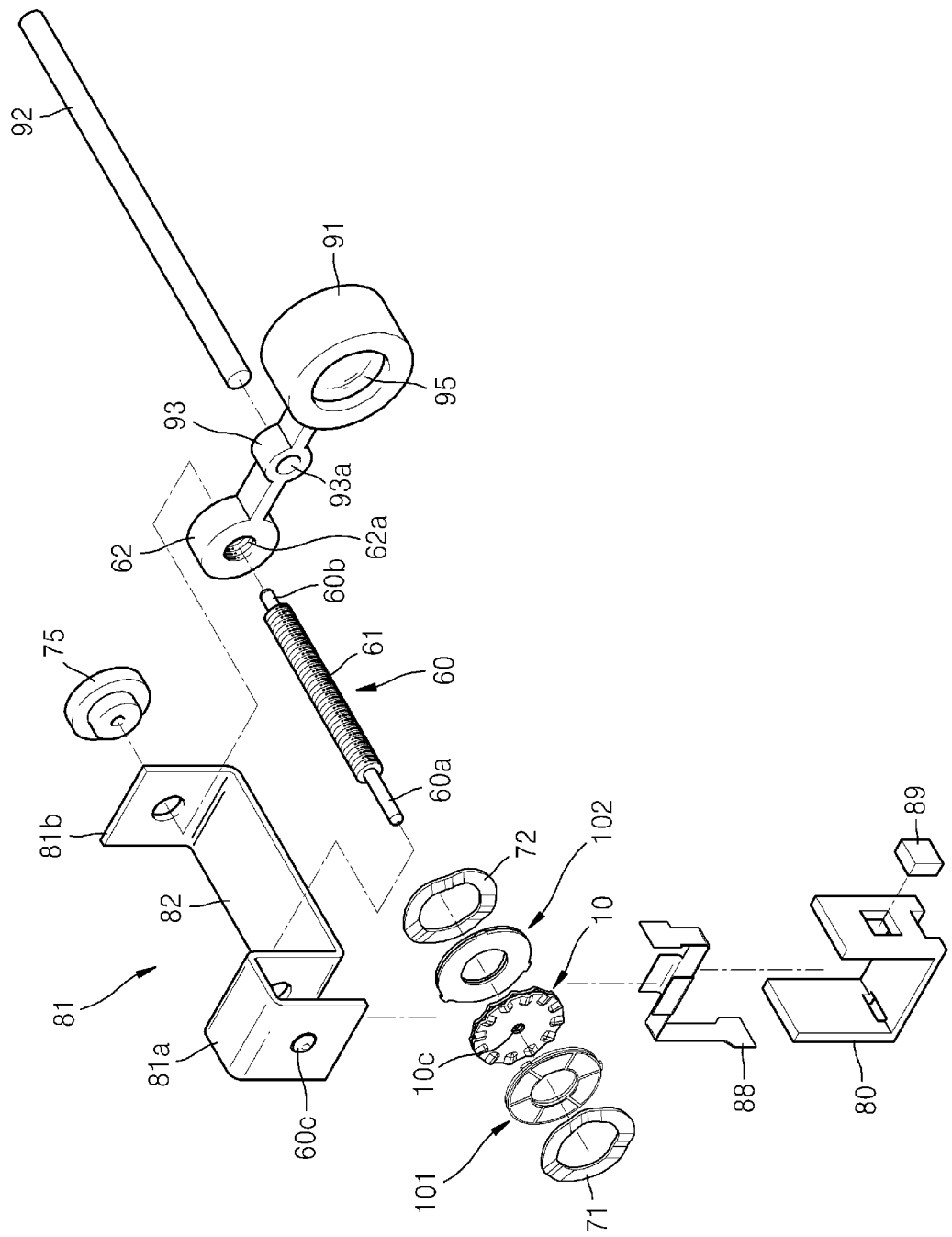
FIG. 4 is an exploded perspective view showing a combination relationship of components of the vibrating actuator assembly of FIG. 2.

FIG. 2 is a perspective view schematically illustrating a vibrating actuator assembly 100 of the digital image processing apparatus 200 of FIG. 1, FIG. 3 is a perspective view of some components of the vibrating actuator assembly 100 of FIG. 2, and FIG. 4 is an exploded perspective view showing a combination relationship of components of the vibrating actuator assembly 100 of FIG. 2.

The digital image processing apparatus 200 may include the vibrating actuator assembly 100 of FIG. 2, which moves a lens frame 91 provided with a lens 95. The digital image processing apparatus 200 may move the lens 95 in an optical axis direction by using the vibrating actuator assembly 100.

The vibrating actuator assembly 100 according to the embodiment of FIGS. 2 through 4 includes a rotor 10 that is rotatable, a first stator 101 disposed on one side of the rotor 10, and a second stator 102 disposed on the other side of the rotor 10. The lens 95 is movably disposed inside a barrel 213, and the vibrating actuator assembly 100 generates driving power for moving the lens 95 within the barrel 213.

The rotor 10, the first stator 101, and the second stator 102 of the vibrating actuator assembly 100 are accommodated in a casing 81a. The casing 81a surrounds and supports the rotor 10, the first stator 101, and the second stator 102. A cover 80 surrounds a portion of the casing 81a. A circuit board 88 for supplying an electrical signal to the first and second stators 101 and 102 is disposed within the cover 80.

The first stator 101 includes a first vibrating plate 20 contacting one surface of the rotor 10 and a first vibrating device 30 deforming the first vibrating plate 20. The second stator 102 includes a second vibrating plate 40 contacting the other surface of the rotor 10 and a second vibrating device 50 deforming the second vibrating plate 40.

The first and second vibrating devices 30 and 50 vibrate when an electrical signal is applied, thereby respectively deforming the first and second vibrating plates 20 and 40 respectively disposed on either side of the rotor 10.

The first and second vibrating devices 30 and 50 may each include a piezoelectric device. The piezoelectric device may be a stacked type piezoelectric device manufactured by stacking a plurality of electrodes or a single layer piezoelectric device, and generates vibration according to driving waves of an alternating current when the alternating current is applied. However, this embodiment is not limited to the first and second vibrating devices 30 and 50 each including the piezoelectric device, this embodiment may be modified such as to use a different type of component that vibrates when a current is applied.

Since electrical signals having different phases are applied to the first and second vibrating devices 30 and 50, the first and second vibrating devices 30 and 50 may independently vibrate.

The first and second vibrating plates 20 and 40 are respectively disposed on either side of the rotor 10, and may be elastically deformed. In other words, the shapes of the first and second vibrating plates 20 and 40 are temporarily deformed according to an applied external force and then are returned to their original shapes when the external force is removed.

The first and second vibrating plates 20 and 40 may be formed of, for example, rubber, elastic synthetic resins, or a metal plate that is elastically deformed by strong vibrating power.

Figure 5:
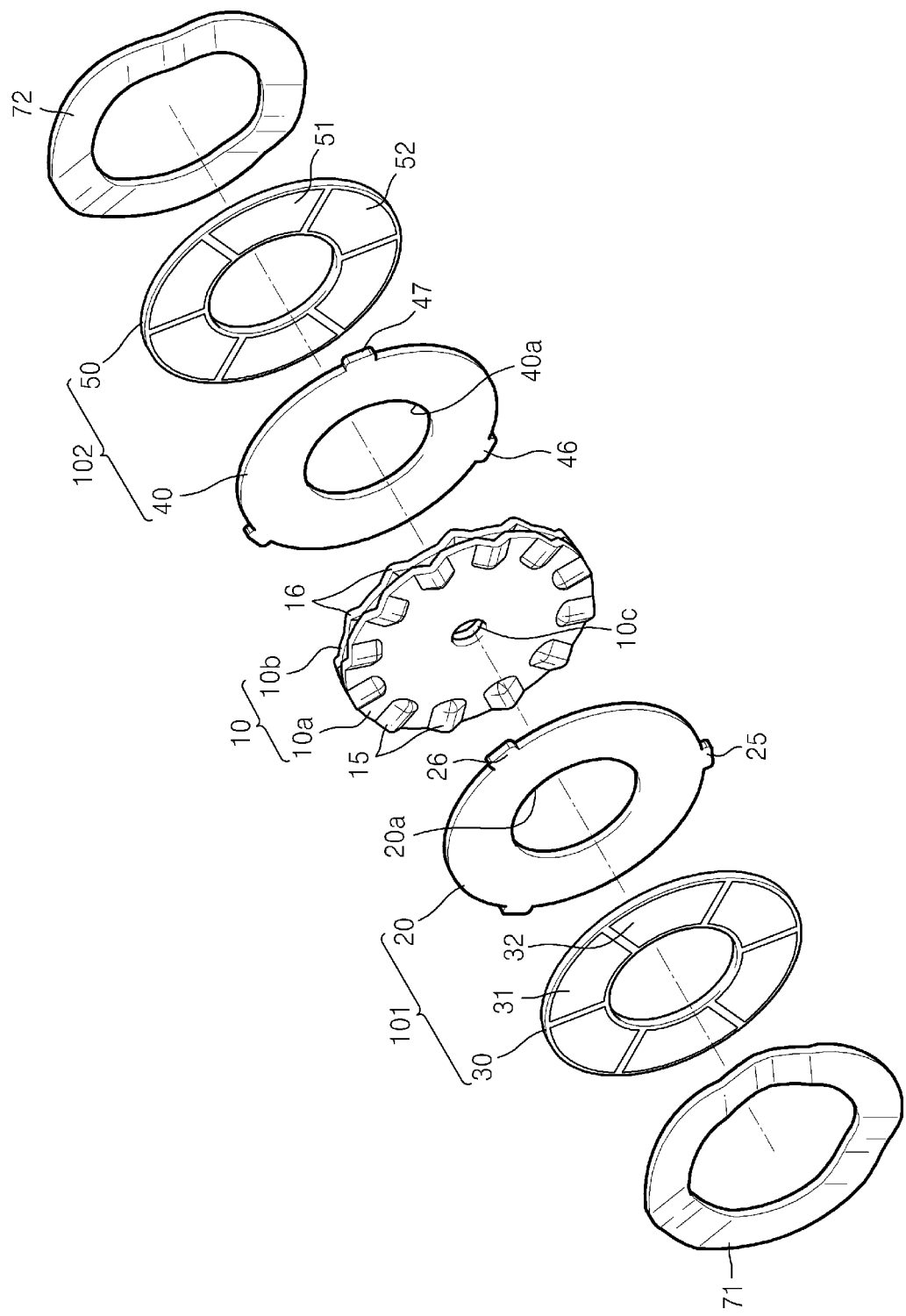
FIG. 5 is an exploded perspective view of some components of the vibrating actuator assembly of FIG. 2.

FIG. 5 is a perspective view of some components of the vibrating actuator assembly 100 of FIG. 2.

The first and second vibrating plates 20 and 40 may include adjusting protrusions 25, 26, 46, and 47 that externally protrude. The adjusting protrusions 25, 26, 46, and 47 are used to adjust rotating locations of the first and second vibrating plates 20 and 40 in a circumferential direction with respect to the rotor 10, when the first and second vibrating plates 20 and 40 are respectively disposed on either side of the rotor 10. By adjusting the adjusting protrusions 25, 26, 46, and 47 using a pre-manufactured jig, the rotating locations of the first and second vibrating plates 20 and 40 may be precisely and quickly adjusted.

As described above, the first stator 101 includes the first vibrating device 30 on one side of the first vibrating plate 20, and the second stator 102 includes the second vibrating device 50 on one side of the second vibrating plate 40. When the first and second stators 101 and 102 are disposed respectively on either side of the rotor 10, the locations of the first vibrating device 30 of the first stator 101 and the second vibrating device 50 of the second stator 102 may be offset in the rotating direction instead of being matched.

In FIG. 5, a plurality of piezoelectric devices 51 and 52 are disposed in the second vibrating device 50 in the same form as a plurality of piezoelectric devices 31 and 32 disposed in the first vibrating device 30, and here, the locations of the first and second vibrating devices 30 and 50 in the rotating direction are misaligned so that the locations of the piezoelectric devices 31, 32, 51, and 52 are misaligned. In the embodiment shown in FIG. 5, the piezoelectric devices 31 and 32 have the same sizes and the six piezoelectric devices 31 and 32 are disposed in a circumferential direction. Thus, each of the piezoelectric devices 31 and 32 has an angle of about 60° in a circumferential direction of the first vibrating device 30. The first and second vibrating devices 30 and 50 may be offset in the circumferential direction in a range from about 10° to about 30°. In detail, the first and second vibrating devices 30 and 50 may be misaligned by an angle of about 15°.

Structures of the first and second stators 101 and 102 are not limited to the embodiment of FIG. 5, and may vary. For example, in the embodiment of FIG. 5, the first and second vibrating devices 30 and 50 are respectively combined to surfaces of the first and second vibrating plates 20 and 40 opposite to surfaces facing the rotor 10; but alternatively, the first vibrating device 30 may be disposed on the surface of the first vibrating plate 20 facing the rotor 10, and the second vibrating device 50 may be disposed on the surface of the second vibrating plate 40 facing the rotor 10.

The rotor 10 is rotatably disposed between the first and second vibrating plates 20 and 40 to rotate according to vibration transmitted through the first and second vibrating plates 20 and 40, thereby converting vibrating movements of the first and second vibrating plates 20 and 40 generated by the vibration of the first and second vibrating devices 30 and 50 to rotating movements.

The rotor 10 is manufactured to generally have a circular plate shape, and a plurality of protrusions 15 and 16 are spaced apart from each other along a circumferential direction of the rotor 10 on each of two surfaces of the rotor 10. Also, the rotor 10 includes a first through hole 10c penetrating the center of the rotor 10. In FIG. 5, the rotor 10 is manufactured by bonding a first plate 10a and a second plate 10b, but other configurations are possible. For example, alternatively, the rotor 10 may be manufactured by using one plate and protrusions may be provided on two surfaces of the rotor 10.

Elastic members 71 and 72 are respectively disposed outside the first and second stators 101 and 102. Referring back to FIG. 4, the elastic members 71 and 72 contact the casing 81a while respectively urging the first and second stators 101 and 102 toward the rotor 10. The elastic members 71 and 72 maintain predetermined pressures between the first stator 101 and the rotor 10 and between the second stator 102 and the rotor 10 so that vibration generated in the first and second stators 101 and 102 are transmitted to the rotor 10.

Structures of the elastic members 71 and 72 are not limited to those shown in FIGS. 4 and 5, and alternatively, elastic members having a clip shape, which makes the first stator 101 and the second stator 102 contact outer circumferential surfaces of the rotor 10 by pressurizing the first and second stators 101 and 102 toward the rotor 10, may be used.

Referring to FIGS. 3, 4, and 5, a rotation shaft 60 is inserted into the first through hole 10c of the rotor 10, and thus the rotation shaft 60 may rotate with the rotor 10. The first vibrating plate 20 includes a second through hole 20a at a location corresponding to the first through hole 10c, and the second vibrating plate 40 includes a third through hole 40a at a location corresponding to the first through hole 10c. One end 60a of the rotation shaft 60 is operatively connected to the rotor 10 through the third through hole 40a, the first through hole 10c, and the second through hole 20a.

A first supporter 60c provided outside the casing 81a rotatably supports the rotation shaft 60. One end 60a of the rotation shaft 60 is disposed within the first supporter 60c. Referring to FIG. 3, the other end 60b of the rotation shaft 60 is rotatably supported by a second supporter 75 disposed outside a flange 81b.

Referring to FIG. 4, the casing 81a and the flange 81b for accommodating the components of the vibrating actuator assembly 100 are respectively connected to two ends of an extending plate 82 extending along a longitudinal direction of the rotation shaft 60. A base 81 including the casing 81a, the flange 81b, and the extending plate 82 stably supports the rotation shaft 60 and all other components of the vibrating actuator assembly 100.

A screw surface 61 is formed on the outer circumferential surface of the rotation shaft 60, and a moving block 62 moving along the rotation shaft 60 is formed outside the rotation shaft 60. Since the moving block 62 includes a thread 62a combined to the screw surface 61 of the rotation shaft 60, the moving block 62 may move along the extending direction of the rotation shaft 60 as the rotation shaft 60 is rotated.

The moving block 62 is connected to the lens frame 91 supporting the lens 95. The lens frame 91 includes a rail portion 93 slidably supported on a guide portion 92 extending approximately parallel to the rotation shaft 60. The rail portion 93 includes a guide hole 93a into which the guide portion 92 is inserted. Since the lens frame 91 slides along the guide portion 92 together with the moving block 62 when the moving block 62 moves along the rotation shaft 60, the location of the lens 95 may be adjusted in the optical axis direction.

Figure 6:
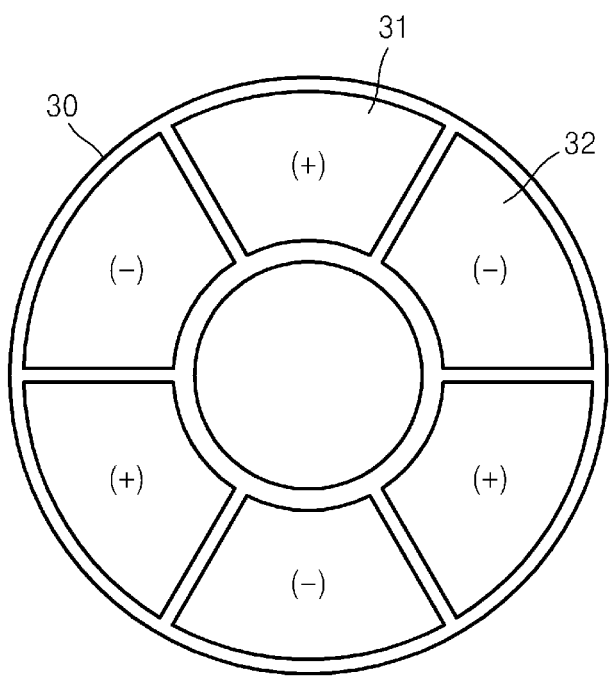
FIG. 6 is a front view schematically illustrating a first vibrating device of the vibrating actuator assembly of FIG. 2.
Figure 7:
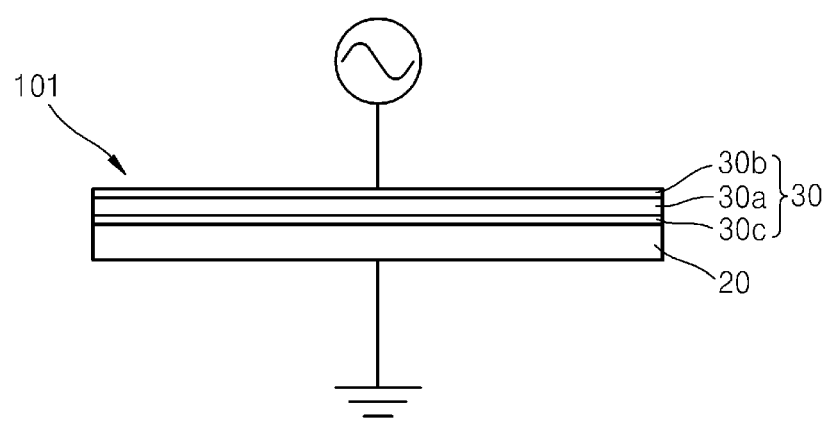
FIG. 7 is a side view schematically illustrating a first stator of the vibrating actuator assembly of FIG. 2.

FIG. 6 is a front view schematically illustrating the first vibrating device 30 of the vibrating actuator assembly 100 of FIG. 2, and FIG. 7 is a side view schematically illustrating the first stator of the vibrating actuator assembly 100 of FIG. 2.

FIGS. 6 and 7 respectively show structures of the first vibrating device 30 and the first stator 101 of the vibrating actuator assembly 100, but the second vibrating device 50 and the second stator 102 of FIGS. 2 through 5 may have the same structures.

The first stator 101 includes the first vibrating plate 20 and the first vibrating device 30. The first vibrating plate 20 has a circular plate shape, and includes the second through hole 20a (see FIG. 5) at the center thereof. The plurality of piezoelectric devices 31 and 32 spaced apart from each other along the circumferential direction are disposed in the first vibrating device 30. The plurality of piezoelectric devices 31 and 32 forming the first vibrating device 30 are spaced apart from each other at predetermined intervals along the circumferential direction around the first vibrating plate 20, and are symmetrical based on the first vibrating plate 20.

The adjacent piezoelectric devices 31 and 32 in the first vibrating device 30 have opposite polarities. As shown in FIG. 6, polarization directions of the adjacent piezoelectric devices 31 and 32 may be opposite so that polarities of the piezoelectric devices 31 and 32 spaced apart from each other at predetermined intervals along the circumferential direction of the first vibrating plate 20 are alternately changed.

As shown in FIG. 7, the first vibrating device 30 of the first stator 101 includes a piezoelectric layer 30a and electrode layers 30b and 30c respectively disposed on two surfaces of the piezoelectric layer 30a. This embodiment is not limited to the specific structure of the first vibrating device 30 illustrated; the number of electrode layers 30b and 30c may vary by repeatedly stacking the electrode layers 30b and 30c and arranged locations of the electrode layers 30b and 30c with respect to the piezoelectric layer 30a may also vary.

The piezoelectric layer 30a is manufactured by using an element showing a piezoelectric effect, where the element is mechanically deformed or generates power when an electrical signal is applied. When an electrical signal is applied to the electrode layers 30b and 30c, the piezoelectric layer 30a vibrates by repeatedly expanding and contracting. Since the polarities of the adjacent piezoelectric devices 31 and 32 are opposite to each other, the adjacent devices 31 and 32 expand and contract in opposite directions.

Figure 8:
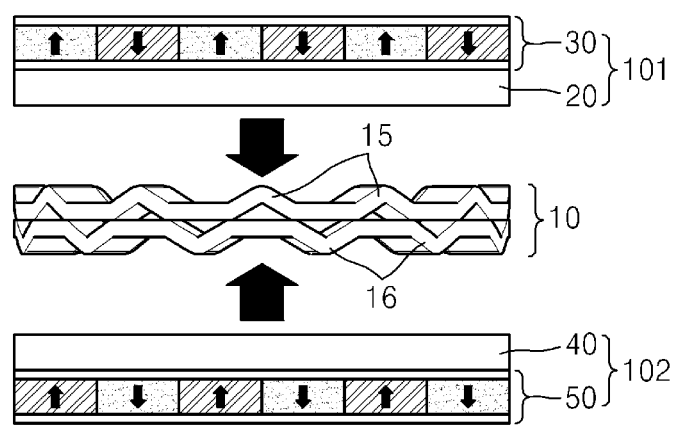
FIG. 8 is a diagram that illustrates the connection and operations of some components of the vibrating actuator assembly of FIG. 2.
Figure 9:
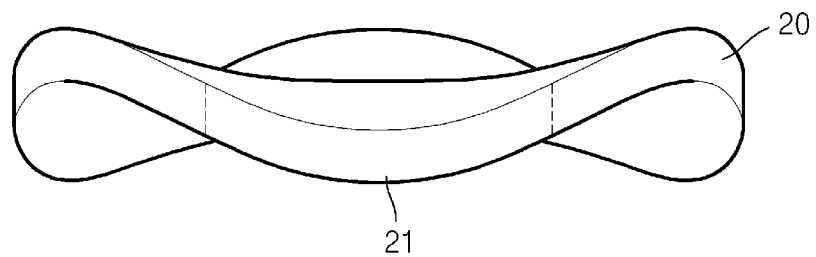
FIG. 9 is a view showing a vibrating state of a first vibrating plate of the vibrating actuator assembly of FIG. 2.
Figure 10:
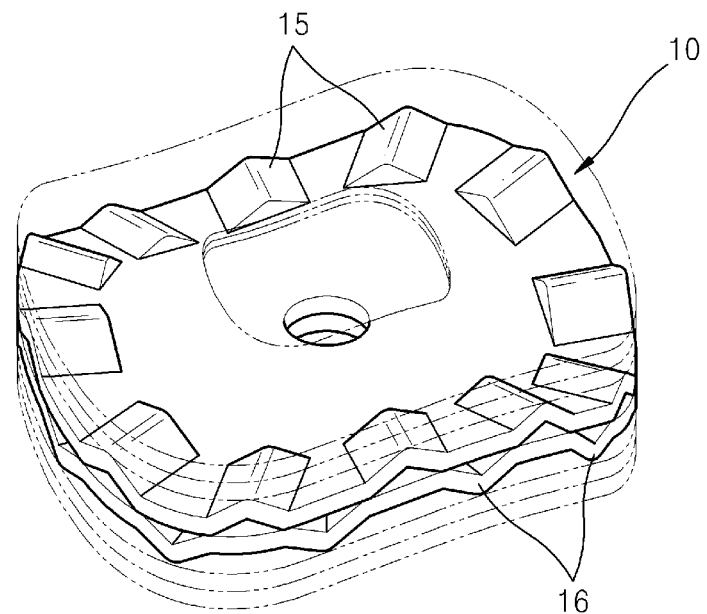
FIG. 10 is a view showing a vibrating state of a rotor of the vibrating actuator assembly of FIG. 2.

FIG. 8 is a diagram that illustrates the connection and operations of some components of the vibrating actuator assembly 100 of FIG. 2, FIG. 9 is a view showing a vibrating state of the first vibrating plate 20 of the vibrating actuator assembly 100 of FIG. 2, and FIG. 10 is a view showing a vibrating state of the rotor 10 of the vibrating actuator assembly 100 of FIG. 2.

According to an arranged structure of the first vibrating device 30 described above, the first vibrating device 30 vibrates the first vibrating plate 20 as shown in FIG. 9 when an electrical signal is applied to the first vibrating device 30. The first vibrating plate 20 of FIG. 9 is in a state of a first movement, wherein a first region 21 of the first vibrating plate 20 protrudes downward and a second region 22 adjacent to the first region 21 protrudes upward. In other words, the first and second regions 21 and 22 are deformed to protrude in opposite directions.

The first vibrating plate 20 in the state of the first movement as shown in FIG. 9 is deformed to a state of a second movement, wherein the first region 21 protrudes upward and the second region 22 protrudes downward, in an opposite manner shown in FIG. 9, after a predetermined period of time. As such, the first vibrating plate 20 vibrates by repeating the first and second movements.

Although not shown in FIG. 9, the second vibrating plate 40 moves opposite to the first vibrating plate 20 because an electrical signal having a different phase from the electrical signal applied to the first vibrating device 30 is applied to the second vibrating device 50.

Referring to FIG. 8, the first vibrating plate 20 of the first stator 101 and the second vibrating plate 40 of the second stator 102 respectively contact the protrusions 15 and 16 of the rotor 10, and transfer power according to vibration to the rotor 10.

Upon receiving the power according to vibration of the first and second vibrating plates 20 and 40, the rotor 10 may be momentarily deformed as shown in FIG. 10 to rotate.

Figure 11:
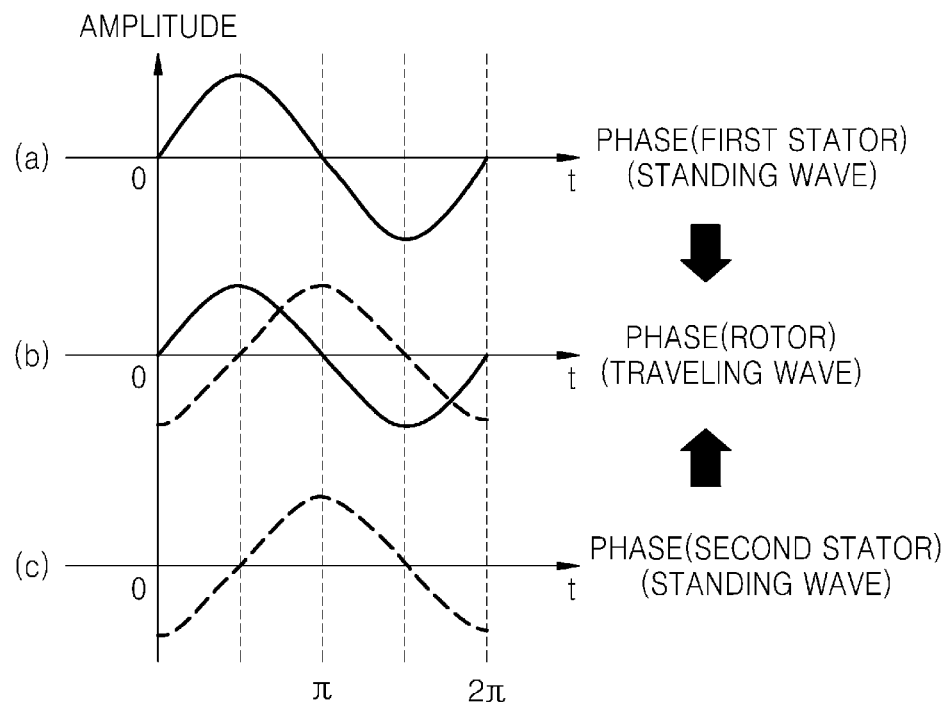
FIG. 11 is a graph illustrating amplitudes of the rotor and first and second stators of the vibrating actuator assembly of FIG. 2.

FIG. 11 is a graph illustrating amplitudes of the rotor 10 and the first and second stators 101 and 102 of the vibrating actuator assembly 100 of FIG. 2.

In FIG. 11, graph (a) shows the amplitude of vibration movement of the first stator 101 over time, graph (c) shows the amplitude of vibration movement of the second stator 102 over time, and graph (b) shows the rotor 10 being vibrated as the vibrating movements of the first and second stators 101 and 102 transmitted to the rotor 10 are combined.

The vibration movements of the first and second stators 101 and 102 correspond to a vibration movement according to standing waves, wherein the first and second stators 101 and 102 vibrate at fixed locations. On the other hand, the vibration movement of the rotor 10 corresponds to a vibration movement according to traveling waves or surface acoustic waves, wherein vibration is transmitted along a surface of the rotor 10.

In order to realize the vibration movements of the first and second stators 101 and 102 described above, electrical signals having different phases may be applied respectively to the first and second vibrating devices 30 and 50 of FIG. 5. For example, an electrical signal having a phase delayed by about 90° than an electrical signal applied to the first vibrating device 30 may be applied to the second vibrating device 50. As described above in relation to the arrangements of the first and second vibrating devices 30 and 50, the first and second vibrating devices 30 and 50 are offset in the circumferential direction in the range from about 10° to about 30°. Due to such a phase difference between the first and second vibrating devices 30 and 50 and a phase difference between the electrical signals, the first and second stators 101 and 102 perform the vibration movements while forming a spatial interval and a temporal interval. As a result, a rotation movement of the rotor 10 may be precisely realized.

Figure 12:
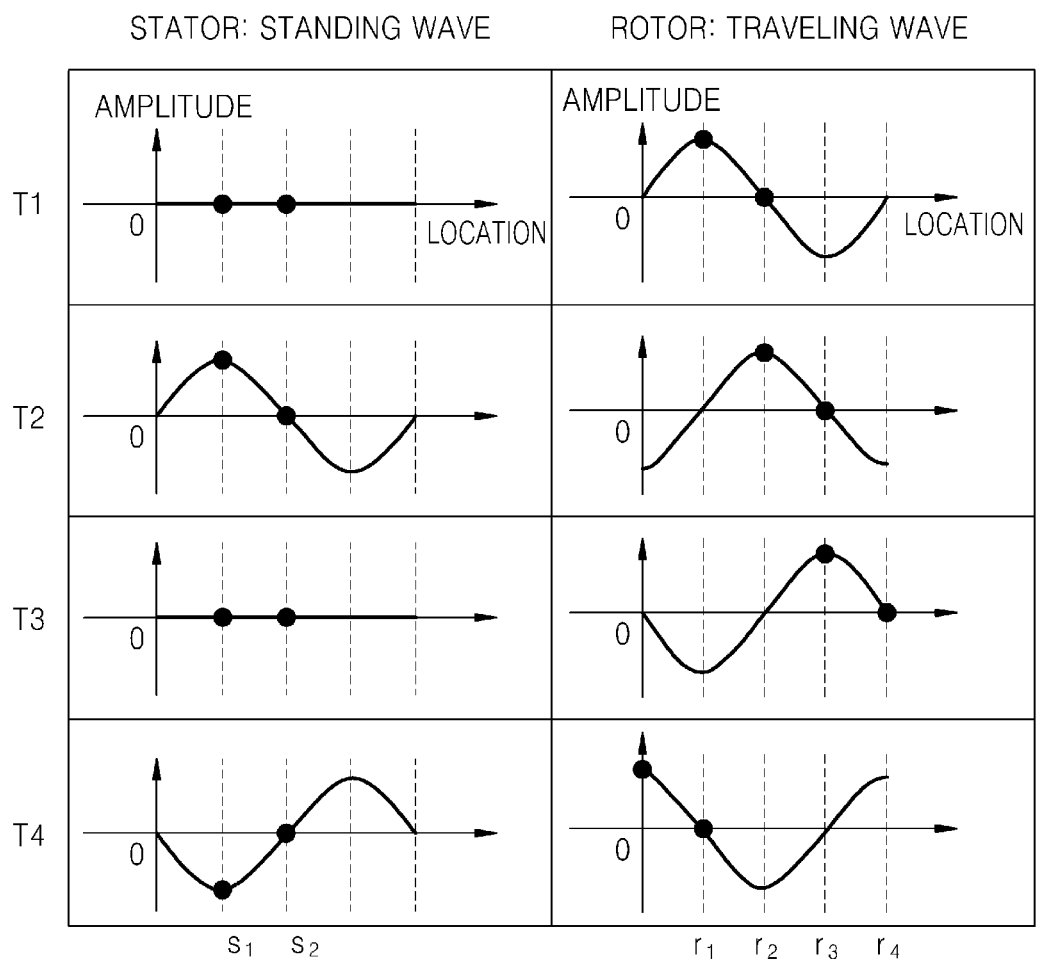
FIG. 12 is a graph illustrating operation relationships over time at certain locations of the rotor and the first and second stators of the vibrating actuator assembly of FIG. 2.

FIG. 12 is a graph illustrating operation relationships over time at certain locations of the rotor 10 and the first and second stators 101 and 102 of the vibrating actuator assembly 100 of FIG. 2.

The four graphs on the left in FIG. 12 show vibration movements of the first and second stators 101 and 102 according to standing waves respectively at times T1, T2, T3, and T4.

An amplitude at a certain location $S_1$ on a surface of a stator corresponds to 0 at the time T1, and reaches a maximum amplitude by protruding upward at the time T2 when an electrical signal is applied. The amplitude at the certain location $S_1$ on the surface of the stator returns to 0 at the time T3, and reaches a maximum amplitude by protruding downward at the time T4. Meanwhile, a location $S_2$ adjacent to the certain location $S_1$ on the surface of the stator continuously maintains an amplitude 0 without vibrating. As such, surfaces of the first and second stators 101 and 102 perform vibration movements according to standing waves, wherein the surfaces vibrate while being fixed at their locations.

The four graphs on the right in FIG. 12 show vibration movements of the rotor 10 according to traveling waves respectively at times T1, T2, T3, and T4.

A first location $r_1$ of a rotor protrudes upward to a maximum at the time T1, whereas a second location $r_2$ adjacent to the first location $r_1$ protrudes upward to a maximum at the time T2. Also, third and fourth locations $r_3$ and $r_4$ protrude to a maximum respectively at the times T3 and T4. As such, the vibration movement generated in the rotor 10 is a vibration movement according to traveling waves, wherein vibration is transmitted along a surface of the rotor 10.

Figure 13:
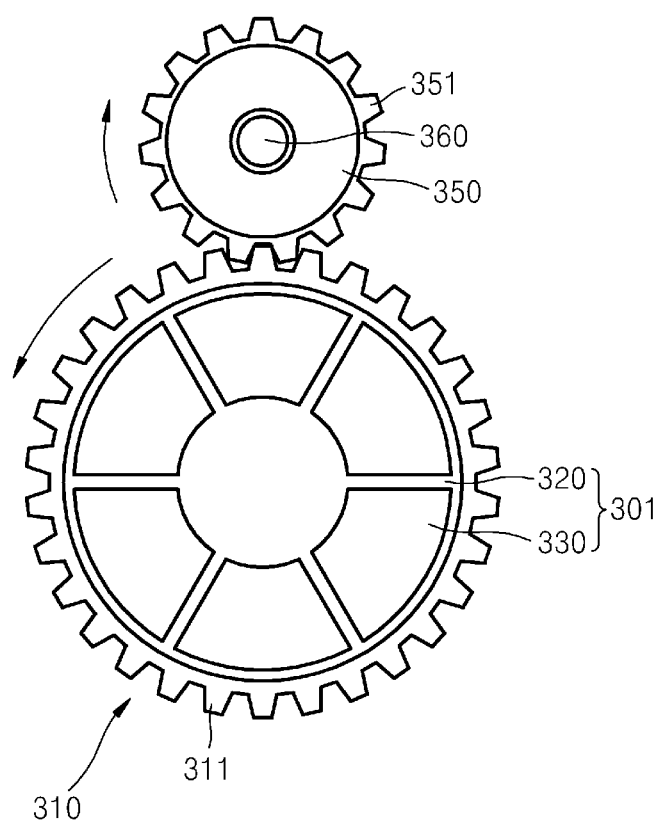
FIG. 13 is a front view of some components of a vibrating actuator assembly according to another embodiment.

FIG. 13 is a front view of some components of a vibrating actuator assembly according to another embodiment.

The vibrating actuator assembly of FIG. 13 according to the current embodiment has a similar structure to the vibrating actuator assembly 100 described above with reference to FIGS. 1 through 10, except for a connection relationship between a rotor 310 and a rotation shaft 360.

A stator 301 including a vibrating plate 320 and a vibrating device 330 is disposed on a surface of the rotor 310, and the rotor 310 rotates according to vibration of the stator 301. The rotor 310 includes a gear 311 that externally protrudes. The rotation shaft 360 is rotatably disposed outside the stator 301, and a power transmitter 350 including a gear 351 that externally protrudes is disposed in engagement with the rotation shaft 360. Since the gear 351 of the power transmitter 350 is engaged with the gear 311 of the rotor 310, rotatory power of the rotor 310 is transmitted to the rotation shaft 360 through the power transmitter 350 as the rotor 310 rotates.

The vibrating actuator assemblies according to the above-described embodiments have stabilized driving performance and thus may be reliably controlled since the vibration movements are generated in balance as the stators are respectively disposed on either side of the rotor. Also, since a fixed vibration movement is generated in the stator according to standing waves and a vibration movement is generated in the rotor according to traveling waves as the fixed vibration movement of the stator is transmitted to the rotor, a phenomenon of the vibration movement according to the traveling waves being deformed or transmitted to another component may be reduced. In addition, since rotational movement of the rotor is realized as electrical signals having different phases are applied respectively to the vibrating devices included in the stators respectively disposed on the two surfaces of the rotor, an actuator may be stably driven while the vibration movements are generated symmetrically on the two surfaces of the rotor.

Also, since the vibrating devices may not be asymmetrically disposed by dividing sections while disposing the vibrating devices of the stators, difficulties of designing and manufacturing an interval between the vibrating devices and lengths of the vibrating devices may be reduced.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the present invention.

What is claimed is:

1. A vibrating actuator assembly comprising:
a rotor that is rotatable;
a first stator disposed on one side of the rotor and comprising
a first vibrating plate that is elastically deformable, and
a plurality of first vibrating devices that are disposed on the first vibrating plate along a circumferential direction of the first vibrating plate, spaced apart from one another at predetermined intervals along the circumferential direction based on a center of the first vibrating plate, and symmetrical around the first vibrating plate,
wherein the plurality of first vibrating devices deform the first vibrating plate by vibrating when an electrical signal is applied; and
a second stator disposed on the other side of the rotor and comprising
a second vibrating plate that is elastically deformable, and
a plurality of second vibrating devices that are disposed on the second vibrating plate along a circumferential direction of the second vibrating plate and spaced apart from one another along the circumferential direction based on a center of the second vibrating plate so as to respectively correspond to the plurality of first vibrating devices,
wherein the plurality of second vibrating devices deform the second vibrating plate by vibrating when an electrical signal is applied,
wherein electrical signals having different phases are respectively applied to the first and the plurality of second vibrating devices, and
wherein the locations of the first and second stators in a rotating direction are offset in a predetermined angle such that locations of the plurality of second vibrating devices facing the plurality of the first vibrating devices are misaligned.

2. The vibrating actuator assembly of claim 1, wherein adjacent first vibrating devices from among the plurality of first vibrating devices have opposite polarities, and adjacent second vibrating devices from among the plurality of second vibrating devices have opposite polarities.

3. The vibrating actuator assembly of claim 1, wherein the rotor has a circular plate shape, and comprises a plurality of first protrusions protruding from a first side of the rotor facing the first stator and a second plurality of protrusions protruding from a second side of the rotor facing the second stator.

4. The vibrating actuator assembly of claim 3, wherein the first and second plurality of protrusions are spaced apart from each other along a circumferential direction.

5. The vibrating actuator assembly of claim 3, wherein the first and second plurality of protrusions are disposed symmetrically with respect to a rotation center of the rotor.

6. The vibrating actuator assembly of claim 1, wherein the rotor comprises a first through hole penetrating through the center of the rotor, and the vibrating actuator assembly further comprises a rotation shaft inserted into the first through hole and rotating with the rotor.

7. The vibrating actuator assembly of claim 6, wherein the first vibrating plate comprises a second through hole corresponding to the first through hole, the second vibrating plate comprises a third through hole corresponding to the second through hole, and the rotation shaft penetrates the first, second, and third through holes.

8. The vibrating actuator assembly of claim 1, further comprising a rotation shaft disposed outside the rotor to contact the rotor and rotating according to rotary power of the rotor.

9. The vibrating actuator assembly of claim 8, wherein a power transmitter transmitting the rotary power to the rotation shaft is disposed between the rotation shaft and the rotor.

10. The vibrating actuator assembly of claim 3, wherein a screw surface is formed on an outer circumferential surface of the rotation shaft, and the vibrating actuator assembly further comprises a moving block disposed outside the rotation shaft and screwed to the screw surface to move along the rotation shaft as the rotation shaft rotates.

11. The vibrating actuator assembly of claim 1, further comprising elastic members that surround at least a part of peripheries of the first stator, the second stator, and the rotor and press the first and second stators toward the rotor.

12. The vibrating actuator assembly of claim 1, further comprising a casing surrounding and supporting the first stator, the second stator, and the rotor.

13. The vibrating actuator assembly of claim 12, further comprising a plurality of elastic members each disposed between the first stator and the casing and between the second stator and the casing to urge the first and second stators toward the rotor.

14. The vibrating actuator assembly of claim 1, wherein the first vibrating device comprises a piezoelectric layer vibrating when electrical power is applied, and an electrode layer adhered to the piezoelectric layer to apply electrical power to the piezoelectric layer.

15. The vibrating actuator assembly of claim 1, wherein the second vibrating device comprises a piezoelectric layer vibrating when electrical power is applied, and an electrode layer adhered to the piezoelectric layer to apply electrical power to the piezoelectric layer.

16. The vibrating actuator assembly of claim 1, wherein the first vibrating plate comprises at least one adjusting protrusion that externally protrudes, and the second vibrating plate comprises at least one adjusting protrusion that externally protrudes.

17. The vibrating actuator assembly of claim 3, wherein the locations of the plurality of first protrusions are offset from locations of the plurality of second protrusions along a rotating direction of the rotor at a predetermined angle.

* * * * *

UNITED STATES PATENT AND TRADEMARK OFFICE
CERTIFICATE OF CORRECTION

| | |
|---|---|
| PATENT NO. | : 9,209,714 B2 |
| APPLICATION NO. | : 13/763867 |
| DATED | : December 8, 2015 |
| INVENTOR(S) | : Lee |

It is certified that error appears in the above-identified patent and that said Letters Patent is hereby corrected as shown below:

IN THE CLAIMS:

Claim 1, Column 11, lines 38-39, replace "respectively applied to the first and the plurality of second vibrating devices" with -- respectively applied to the plurality of first and the plurality of second vibrating devices --

Signed and Sealed this
Twenty-ninth Day of March, 2016

Michelle K. Lee
*Director of the United States Patent and Trademark Office*